United States Patent [19]
Chatelain

[11] Patent Number: 5,676,104
[45] Date of Patent: Oct. 14, 1997

[54] STEPPED PISTON FOR A MOTOR, PUMP OR COMPRESSOR

[76] Inventor: Michel Chatelain, 10 rue du Ramponnet, F-74940 Annecy Le Vieux, France

[21] Appl. No.: 578,584
[22] PCT Filed: May 2, 1995
[86] PCT No.: PCT/FR95/00564
   § 371 Date: Dec. 28, 1995
   § 102(e) Date: Dec. 28, 1995

[30] Foreign Application Priority Data

May 2, 1994 [FR] France .................. 94 05295

[51] Int. Cl.⁶ .................................................. F02B 19/04
[52] U.S. Cl. ....................................... 123/193.6; 92/257
[58] Field of Search ........................... 123/193.6, 671; 92/255, 257, 258

[56] References Cited

U.S. PATENT DOCUMENTS

| | | | |
|---|---|---|---|
| 2,793,089 | 5/1957 | Anderson | 92/257 |
| 3,999,768 | 12/1976 | Jepson | 92/255 |
| 4,004,499 | 1/1977 | Beck | 92/257 |
| 4,485,779 | 12/1984 | Spurk | 123/193.6 |
| 4,522,163 | 6/1985 | Hooper | 123/193.6 |
| 4,522,173 | 6/1985 | Agache | 123/193.6 |
| 4,955,284 | 9/1990 | Faulkner | 92/257 |
| 5,313,875 | 5/1994 | Kadlicko | 92/255 |

*Primary Examiner*—Marguerite McMahon
*Attorney, Agent, or Firm*—William A. Drucker

[57] ABSTRACT

The piston is composed of three independent elements including a lower element 3 which bears in a housing 4 a gasket segment 5, an intermediate element 2 secured to the lower element 3 so as to retain the segment 5, and a piston head 1 secured to the lower element 3. The imperviousness on the piston head 1 is ensured by a static segment 20 placed in a housing 19 of a segment holder 18 secured to the upper portion of the cylinder 17. The cooling and lubrication of the segment 20 are embodied by an oil circulation in the annular clearance 23 provided between the segment holder 18 and the segment 20.

9 Claims, 1 Drawing Sheet

STEPPED PISTON FOR A MOTOR, PUMP OR COMPRESSOR

FIELD OF THE INVENTION

The invention concerns a stepped piston able to be used for the production of motors, compressors and vacuum pumps.

BACKGROUND OF THE INVENTION

The invention more particularly concerns a production of a stepped piston which, whilst being extremely reliable, is easy to produce at a reduced cost.

It also concerns the production of a stepped piston allowing for the easy mounting of the sectioning of its first stage, as well the easy lubrication and cooling of the sectioning of its second stage.

Finally, the invention also concerns embodying on the second stage of the piston imperviousness assimilating the latter with a cylinder and enabling exhaust ports to be fitted on the latter.

SUMMARY OF THE INVENTION

According to the invention, the stepped piston is made up of three independent elements and includes a lower element which cooperates with the internal wall of the cylinder by a sealing segment, an intermediate element which cooperates with the upper face of the lower element to ensure retention of the sealing segment, and an upper element fixed to the lower element and which imperviously cooperates with the upper portion of the cylinder.

This embodiment of three independent elements enables each element to be made of a particular material adapted to its particular function. In this way, each element of the piston is smaller and easier to produce in an advance technology material (such as a ceramic material for the upper element of the stepped piston).

This disposition facilitates machining and bulk production at a reduced cost.

According to the invention, with the production of three elements, the lower element preferably has on its upper face a peripheral housing which receives the sealing segment and to which the intermediate conical element is to be secured and being fixed to the lower element by screws. Thus, easy access is available to the sealing segment in order to replace it.

According to the invention, the sectioning of the second stage is not on the piston, this being the case in traditional productions which then have the drawback of not enabling this sectioning to be cooled and lubricated, but this sectioning is placed in the cylinder, thus then being static and able to be easily lubricated and cooled.

To this effect, the sealing segment, contained in a support ring placed in a housing of the upper end of the cylinder and kept in this position by a locking screw, cooperates with the wall of the upper element of the piston which, from the point of view of imperviousness, then acts as a cylinder. It then becomes possible to fit exhaust ports on the piston.

The present embodiment is particularly adapted to a use with a guided rodding without any angular clearance. In this case, the piston is fully guided and does not touch the cylinder, only the sectionings being in contact to ensure imperviousness.

BRIEF DESCRIPTION OF THE DRAWINGS

So as to clearly understand the device of the invention, there now follows a preferred non-restrictive embodiment given by way of example with reference to the accompanying drawing whose sole FIGURE is a longitudinal sectional view of a stepped piston according to the invention and placed inside its cylinder.

DETAILED DESCRIPTION OF THE PREFERRED EMBODIMENT

Figure 1:
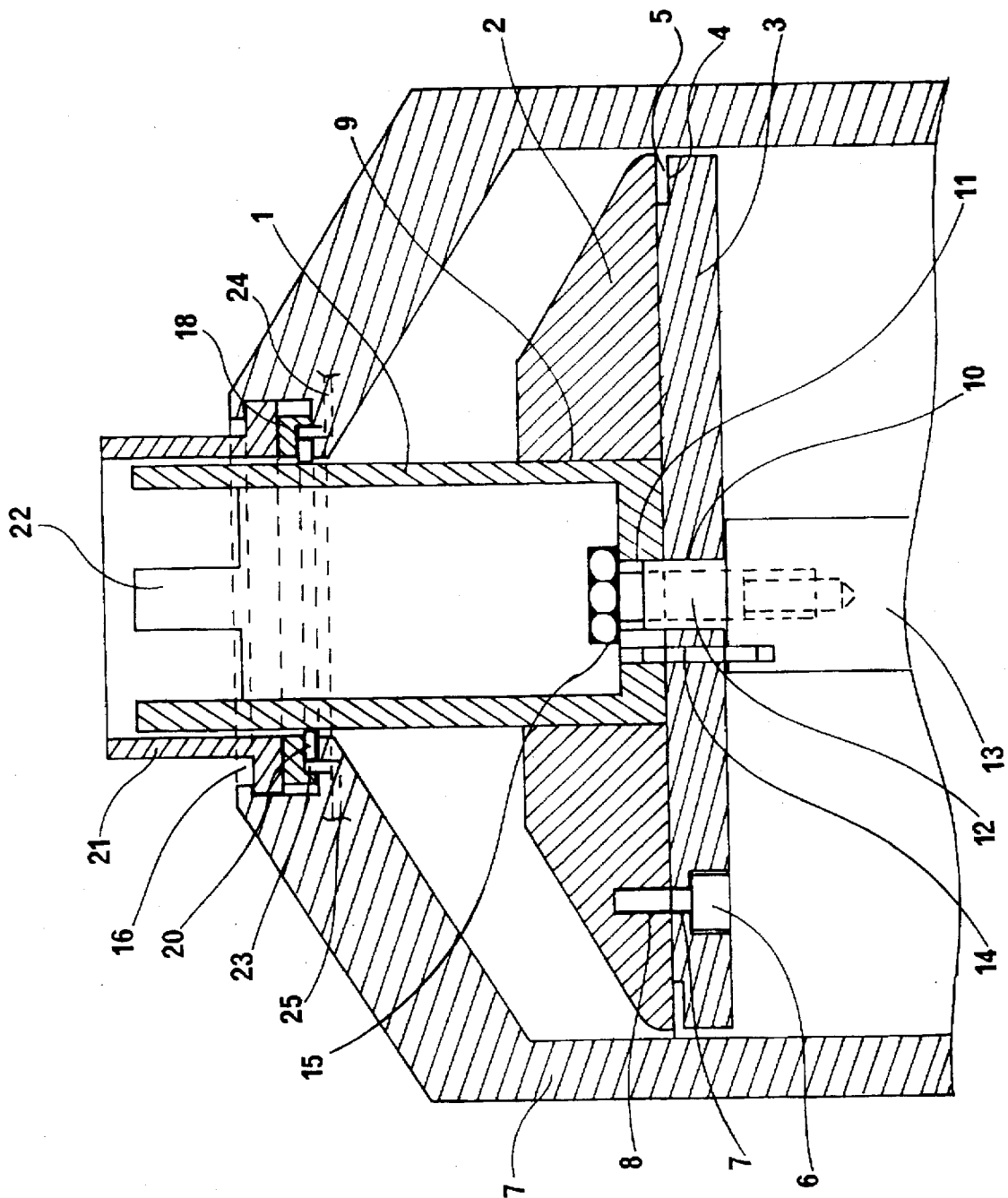

With reference to the drawing, the stepped piston of the invention is made up of three independent combined elements which include a hollow piston head 1 which constitutes the second stage of the stepped piston, as well as an intermediate conical element 2 and a segment holder 3 which when assembled constitute the first stage of the piston.

Placed in a peripheral annular housing 4 fitted in the upper face of the segment holder 3 is an annular sealing segment 5 which is kept in place by applying a conical element 2 fixed to the segment holder 3 by screws 6 traversing housings 7 of the segment holder and being engaged in threaded holes 8 of the conical element 2.

So as to fix it to the segment holder 3, the lower portion of the piston head 1 traverses a central bore 9 of the conical piece 2, thus ensuring the centering of the latter, and engages the upper face of the segment holder 3 so that the central opening 10 of the latter is opposite the central opening 11 provided in the base of the piston head 1. The centering portion 12 of a shouldered guiding rod 13 is engaged in the opposing openings 10, 11 whilst ensuring the centering of the piston head 1 and of the segment holder 3, and a pin 14 ensures the immobilization of the unit, whereas locking is effected by a central screw 15 passing inside the centering portion 12 and being screwed into a tapped opening of the guiding rod 13.

So as to enable the sectioning of the piston head 1 to be lubricated and cooled, this sectioning is static instead of being normally lifted up by the piston head. To this effect, placed in an axial housing 16 of the upper end of the cylinder 17 is a segment holder 18 constituted by a cast iron washer in a housing containing an annular sealing segment 20 whose internal convex diameter cooperates with the outer diameter of the piston head 1. A screw 21 engaged in the housing 16 ensures that the segment 20 is locked.

The static segment 20 is continuously lubricated and cooled by an oil circulation carried out in the annular volume 23 formed by the play existing between the segment 20 and the segment holder 18. Shown at 24 is the oil intake (possibly under pressure) and at 25 the oil outlet, the oil circulation being established on the portion of the segment opposite the one ensuring imperviousness.

The piston head 1, which from the point of imperviousness, behaves like a cylinder with respect to the segment 20, has one notched upper end 22 thus providing notches acting as opening exhaust ports when the notched portion 22 is opposite the sealing segment 20.

The above description has merely been given by way of non-restrictive example and constructive additions or modifications could be made without departing from the context of the invention.

What is claimed is:

1. A stepped piston for an internal combustion engine, compressor or pump, which comprises, in combination:
   (a) a lower element having an upper face and cooperating with the internal wall of the cylinder by a sealing segment,
   (b) an intermediate element having a central bore and cooperating with said upper face of said lower element so as to ensure the support of said sealing element, (c) an upper element fixed to said lower element and cooperating in a sealed way with an upper portion of said cylinder, said upper element having the shape of a cylinder open at its upper end and whose lower portion traverses said central bore of the intermediate element and fixed by screws to said lower element.

2. Stepped piston, according to claim 1, wherein said sealing segment is placed in a peripheral housing of the upper face of said lower element so as to project outwardly.

3. Stepped piston according to claim 1, wherein said intermediate element is fixed by screws to the upper face of the lower element.

4. Stepped piston according to claim 1, wherein the centering portion of the lower element and the upper element is made by introducing into aligned central openings of the lower element and base of the upper element a centering portion of a guided shouldered rod, the locking of the unit being effected by means of a screw traversing the centering portion and screwed in said guiding rod.

5. Stepped piston according to claim 1, wherein an imperviousness between the upper element and the cylinder is embodied by a static sealing segment borne by the cylinder.

6. Stepped piston according to claim 5, wherein the static sealing segment is disposed in a support piece placed in a housing of the upper end of the cylinder and retained by a locking screw.

7. Stepped piston according to claim 1, wherein the upper end of the upper element has a cut shape embodying exhaust ports.

8. Stepped piston according to claim 1, wherein said lower, intermediate and upper elements are made of different materials according to their particular intended usage.

9. Stepped piston according to claim 6, wherein an oil circulation is carried out between an oil intake and an oil outlet in an annular volume disposed between the segment and the support piece.

* * * * *